United States Patent Office 3,251,795
Patented May 17, 1966

3,251,795
STABLE EMULSIONS OF VINYL POLYMERS AND PROCESS OF PRODUCING SAME
Osamu Fukushima and Kanji Matsubayashi, Kurashiki, Japan, assignors to Kurashiki Rayon Co., Ltd., Okayama Prefecture, Japan, a corporation of Japan
No Drawing. Filed Apr. 5, 1960, Ser. No. 20,012
Claims priority, application Japan, Apr. 7, 1959, 34/10,960
9 Claims. (Cl. 260—29.6)

The invention relates to emulsions or dispersions of water-insoluble polyvinyl alcohol derivatives containing basic nitrogen or like derivatives of copolymers composed principally of vinyl alcohol.

For the preparation of aqueous emulsions of polymers, so-called emulsification polymerization was employed in the past. By this process, monomers have been polymerized in water in the presence or absence of an emulsifier and water-insoluble polymers are produced in an aqueous emulsified or dispersed form. When emulsification polymerization has been inapplicable, as in the case of acetalized polyvinyl alcohol, the previously-formed water-insoluble polymer has been emulsified and dispersed in water in the presence of an emulsifier. However, these emulsions have lacked stability, whereas high stability were required for the uses for which they were intended. These prior emulsions have had a tendency to coagulate or precipitate at high or low temperatures at the time of mixing with pigments, plasticizers, water-solutions of polymers, and the like, or by the action of acids, alkalis, salts, and the like, or simply by mechanical impact, or upon standing for several hours, whether or not the emulsion contained an emulsifier.

It is thus an object of the present invention to provide a process for effectively and efficiently producing emulsions of polymers having excellent stability against the action of acid, alkali, salts or other additives, temperature, mechanical impact, and the like, or prolonged standing.

We have conducted a series of studies on methods for producing emulsions of polyvinyl alcohol and polyvinyl alcohol derivatives and we have discovered means for preparing emulsions or dispersions with excellent stability.

In accordance with the present invention, polyvinyl alcohol derivatives having basic nitrogen, or copolymers composed principally of vinyl alcohol or its derivatives containing basic nitrogen are acetalized by means of aldehydes contaiuing no basic nitrogen simultaneously with, or before, or after the introduction of basic nitrogen is effected. We have discovered that by imparting a substantial hydrophilic property to the polymer by introducing basic nitrogen into water-insoluble acetalized polyvinyl alcohol, simultaneously with or before or after an acetalization reaction, it is possible to prepare an emulsion or dispersion which has high stability as compared with an emulsion of acetalized polyvinyl alcohol containing no basic nitrogen. The emulsion produced by the method of this invention is resistant not only to salts, acid, alkali, and prolonged standing but it is highly stable against the several aforementioned factors which tend to induce coagulation. Thus, the process of the present invention provides emulsions of polymers with excellent serviceability.

In order to explain more fully the characteristics of the present invention, reference will now be made to an example in which a polyvinyl alcohol is acetalized by means of aldehydes containing no basic nitrogen, the introduction of basic nitrogen into the polyvinyl alcohol is effected. By adding sulfuric acid and formaldehyde to a water solution of polyvinyl alcohol, and by effecting high-speed agitation of the mixture in the presence of an emulsifier, finely-divided particles of formalized polyvinyl alcohol are produced. When sulfuric acid and $\beta$-aminobutyraldehydedimethylacetal are added to a water suspension of these finely divided particles of formalized polyvinyl alcohol, basic nitrogen is introduced into the molecules by partial aminoacetalization. The finely-divided particles become finer as the reaction progresses, and finally form a stable emulsion.

The sulfuric acid and unreacted aldehydes are then removed by dialysis, and there is obtained an acetalized polyvinyl alcohol emulsion combined with aminoaldehydeformaldehyde which is so stable that it will not precipitate even when it is allowed to stand for many hours or, if it precipitates slightly, it can easily be redispersed merely by shaking. It is highly resistant to the various factors mentioned above which tend to induce coagulation in ordinary emulsions.

According to the method of this invention, it is possible to obtain emulsions or dispersions with sizes ranging from $0.01\mu$ to $10\mu$ diameter and normally the particle diameter is about $1\mu$. Thus, the emulsion can easily be concentrated or rinsed by means of fine-mesh filter cloth. Furthermore, a concentrated emulsion produced in accordance with the invention can be diluted so as to be easily redispersed in water without the need of a surface-active agent. The emulsion thus has important and significant characteristics which are of substantial industrial advantage in the collection of an aminoacetalized fluid or in the purification of an emulsion.

By reference to the foregoing example, the effects of the introduction of basic nitrogen become known, but the reason for the observed effects is not fully understood. However, it is assumed these effects are related to the hydrophilic property imparted by the introduction of basic nitrogen combined with the hydrophobic property of the portion acetalized by means of an aldehyde which does not contain basic nitrogen, the two apparently establishing a state of equilibrium, and to the electric charge given to the polymer itself from which there arises a repulsion among the particles.

In order to illustrate further the industrial significance of the present invention, reference is now made to a further example. As described in Osugi et al., application Serial No. 666,985, filed June 20, 1957, now abandoned, it has been found that the dyeability of polyvinyl alcohol fibers or filaments can be improved by spinning the fibers or filaments from a water solution of polyvinyl alcohol containing emulsified polymers of basic monomers in emulsified and dispersed form. However, in order to prepare a spinning fluid in which such solid particles are homogeneously dispersed, resort must be had to method such as described in Japanese patent application Serial No. 31/2,390 or Japanese patent application Serial No. 3/12,391. Otherwise, smooth spinning is often obstructed by the coagulation of the particles. On the other hand, the emulsion or dispersion of polymers produced by the method of this invention is readily mixable with, for instance, a water-solution of polyvinyl alcohol, and remains stable even at high temperature, whereby smooth spinning of the polyvinyl alcohol solution can easily be carried out.

In order to permit the preparation of a stable polymer emulsion or dispersion in accordance with the present invention, there exists an appropriate relative relationship between the amount of basic nitrogen, in the polyvinyl alcohol, the amount of the polyvinyl alcohol molecule acetalized by means of aldehydes having no basic nitrogen, and the amount of the unreacted polyvinyl alcohol unit, in order to enable a stable emulsion of polymer to be produced. The limits of these relative relationships are dependent upon the magnitude of the hydrophilic property imparted by the basic nitrogen or that of the unit containing basic nitrogen, and the magnitude of the hydrophobic property of the portion acetalized by means of aldehydes having no basic nitrogen. Thus, the relative proportions referred to above will vary but the desired results will be obtained if the quantity of basic nitrogen in the molecule is 0.2 to 5% by weight and if the percent age acetalization by the aldehyde containing no basic nitrogen is 20 to 80%, the remainder being unreacted polyvinyl alcohol units.

Although the emulsion obtained by the method of this invention is sufficiently stable without need for the specific addition of a surface-active stabilizer or protective colloids, there is no objection to the addition of one or more surface-active stabilizers or protective colloids such as dodecyltrimethylammonium chloride, polyoxyethylenedodecyl ether, and the like.

In effecting acetalization by means of aldehydes with no basic nitrogen in carrying out the process of this invention, it is desirable to provide high-speed agitation in the mixture or to use a surface-active agent. By the use of these expedients, the desired emulsion can easily be obtained in the case of polyvinyl alcohol polymers into which basic nitrogen has first been introduced, and these expedients are also useful, in the case of polyvinyl alcohol with no basic nitrogen content when the introduction of basic nitrogen is simultaneously carried out. When the introduction of basic nitrogen is to be effected after acetalization by means of an aldehyde with no basic nitrogen content, it is desired that the introduction of basic nitrogen be effected after the polyvinyl alcohol has been acetalized by the aldehyde containing no basic nitrogen in accordance with the acetalization specified above and the acetalized polyvinyl alcohol has been formed in finely-divided form. In this case, the introduction of basic nitrogen may, of course, be carried out after the acetalized polyvinyl alcohol has been emulsified and dispersed in water in the presence of an emulsifying agent or protective colloid.

As polyvinyl alcohol derivatives containing basic nitrogen, there may be used those produced by reaction of aldehydes containing basic nitrogen upon polyvinyl alcohol or its derivatives, or produced by reaction of polyvinyl alcohol or its derivatives with aldehydes having radicals which can easily be converted to basic nitrogen by epoxy compounds, acetalization products or etherification products, or by direct chemical reaction, and polyvinyl alcohol derivatives into which basic nitrogen has been introduced by chemical reaction of the acetalization or etherification products produced by the use of epoxy compounds, etc.

As copolymers or derivatives composed principally of vinyl alcohol having basic nitrogen, there may be used copolymers formed between vinyl esters and basic monomers, or their saponification products, and copolymers into which basic nitrogen has been introduced by chemical reaction upon copolymers between vinyl esters and monomers having radicals which can easily be changed to basic-nitrogen by chemical reaction.

As other polyvinyl alcohol derivatives or copolymers principally composed of vinyl alcohol, there are suitably used those produced by reaction with aldehydes having radicals which can easily be changed to basic nitrogen by chemical reaction upon polyvinyl alcohol or its derivatives, copolymers of monomers having radicals which can easily be changed to basic nitrogen by chemical reaction, acetalization or etherification products produced by epoxy compounds, and the like, or copolymers of monomers having radicals easily converted to basic nitrogen by chemical reaction with vinyl alcohols and other monomers, and their saponification products.

Representative of chemical reactions suitable for introduction of basic nitrogen into the polyvinyl alcohol molecule which may be employed are acetalization or etherification by means of aldehydes having basic nitrogen, epoxy compounds, ethyleneimine, saponification of acid amides, the reaction of ammonia or an amine upon a halogen radical, amidoximation by means of hydroxylamine upon a cyano radical and various like known reactions.

The aldehydes having basic nitrogen which are suitably used in the process of this invention include aliphatic, aromatic, aralkyl and heterocyclic aldehydes having primary, secondary, or tertiary amino groups such as Aminoacetaldehyde,
Methylaminoacetaldehyde,
Ethylaminoacetaldehyde,
Butylaminoacetaldehyde,
Cyclohexylaminoacetaldehyde,
Nonylaminoacetaldehyde,
Dodecylaminoacetaldehyde,
Dimethylaminoacetaldehyde,
Diethylaminoacetaldehyde,
$\beta$-aminopropionaldehyde,
$\beta$-methylaminopropionaldehyde,
$\beta$-dimethylaminopropionaldehyde,
$\beta$-aminobutylaldehyde,
$\beta$-methylaminobutylaldehyde,
$\beta$-cyclohexylaminobutylaldehyde,
$\beta$-dimethylaminobutylaldehyde,
$\beta$-diethylaminobutylaldehyde,
$\beta$-dimethylaminopyvaleraldehyde,
$\beta$-diethylaminopyvaleraldehyde,
$\beta$-dibutylaminopyvaleraldehyde,
$\alpha$-, $\beta$-, or $\gamma$-pyridinealdehyde,
p-Dimethylaminobenzaldehyde, and other like aldehydes having primary, secondary or tertiary amino groups, or their acetals, or aldehydes having basic nitrogen which has been converted to quaternary form by the action of alkylating agents such as methyliodide, ethylbromide, allylchloride, dimethylsulfate, methyl p-toluenesulfonate, and the like, or their acetals. As epoxy compounds containing basic nitrogen, there are suitably used 1-dimethylamino-2,3-epoxypropane, 1-diethylamino-2,3-epoxypropane, and 1-dibutylamino-2,3-epoxypropane, which are obtained from epichlorhydrine and secondary amines. As aldehydes and epoxy compounds having radicals which can easily be changed to basic nitrogen, there can be used halo aldehydes such as chloracetaldehyde, $\beta$-bromopropionaldehyde, $\beta$-chlorbutylaldehyde, cyano-aldehydes such as $\beta$-cyanopropionaldehyde, and other aldehydes and epoxy compounds such as $\beta$-acetylaminobutylaldehyde, methylglyoxal, acetylacetaldehyde, levulinaldehyde, salicylaldehyde, or their acetals. Other halo and cyano compounds such as epichlorhydrin and acrylonitrile can also be used.

As vinyl esters, there are suitably used, for example, vinyl acetate, and as monomers containing basic nitrogen, there are used 2-vinyl-pyridine,
4-vinylpyridine,
2-methyl-5-vinylpyridine,
5-ethyl-2-vinylpyridine,
4-vinylpyrimidine,
Vinylquinoline,
Allylamine,
$\beta$-diethylaminoethylmethacrylate,
2-methyl-5-vinylpyridiniumethylbromide,
4-vinylpyridiniumdimethyl sulfate,
Allylpyridiniumchloride, and the like. As monomers having radicals which can easily be changed to basic nitrogen, there are used acrylochloride, allylbromide, N-vinylphthalimide, methylvinylketone, acrolein, acrylonitrile, and the like.

As aldehydes having no basic nitrogen, there are suitably used aliphatic, aromatic, aralkyl and cycloaliphatic aldehydes such as Formaldehyde,
Acetaldehyde,
Propionaldehyde,
Butylaldehyde,
Isobutylaldehyde, 2-ethylhexylaldehyde,
Nonylaldehyde,
Docecylaldehyde,
Chloracetaldehyde,
β-cyanopropionaldehyde,
Methylglyoxal,
Malonaldehyde,
Benzaldehyde,
Monochlorbenzaldehyde,
p-Cyanobenzaldehyde,
Terephthaldehyde,
Salicylaldehyde,
1-naphthaldehyde,
Tetrahydrobenzaldehyde,
Trimethyltetrahydrobenzaldehyde,
Hexahydrobenzaldehyde,
Phenylacetaldehyde,
Cinnamaldehyde, and like aliphatic aromatic, aralkyl and cycloaliphatic aldehydes.

In connection with the foregoing, reference is particularly made to our two copending applications filed March 18, 1960, entitled, "Method of Manufacturing Fibers of Polyvinyl Alcohol with Improved Dyeability," and "Method of Making Fibers of Polyvinyl Alcohol Having Improved Dyeability."

In general, various known types of anionic, nonionic, and cationic surface-active agents are suitably used. However, when basic nitrogen is introduced by chemical reaction, an anionic surface-active agent often may form a bond with the introduced basic nitrogen to coagulate the emulsion. Hence, it its preferred to use a non-ionic surface-active agent such as polyoxyethylenedodecyl ether, or a cationic surface-active agent such as dodecyltrimethylammonium chloride. As protective colloids, water-soluble polymers such as polyvinyl alcohol, partially-saponification products of polyvinyl acetate, gelatin, soluble starch, and aminoacetalized polyvinyl alcohol, are suitably used.

The invention will be further understood from the following specific examples of practical application. However, it will be understood that these examples are not to be construed as limiting the scope of the present invention in any manner. In these examples, all parts are by weight.

*Example 1*

A water solution of polyvinyl alcohol (4%), formaldehyde (1%) and sulfuric acid (50%) was treated at 50° C. for 90 min. with stirring, and then the temperature of the solution was lowered to 40° C., and a 5% aqueous solution of a surface-active agent (cetyltrimethylammoniumchloride) was gradually added in an amount equal to the volume of the original reaction fluid, while agitating at the rate of over 2000 r.p.m. When addition of the solution of surface-active agent was completed, polyvinyl formal in finely-divided form (particle diameter: 5μ) was formed. Then β-cyclohexylaminobutylaldehydedimethylacetal was added in the amount of 50 mol percent of the polyvinyl alcohol, the reaction temperature was lowered to 40° C., and reaction was continued for 4 hours. After completion of the reaction, the fine particles of polyvinylacetal containing basic nitrogen which were produced were found to have a particle diameter below 4μ, and a content of basic nitrogen being 1.3%. The aqueous reaction product was then filtered through 1μ-filter paper to remove formaldehyde, β-cyclohexylaminobutylaldehyde, and sulfuric acid, and was washed thoroughly with water. The washed fine particles of polyvinyl acetal containing basic nitrogen were dispersed in water to prepare a water emulsion of 5% concentration. This emulsion or dispersion of fine particles of polyvinyl acetal containing basic nitrogen was extremely stable. After the emulsion had been allowed to stand at 80° C. for 15 days, the condition of the dispersion and the diameter of the particles were examined by means of an optical microscope, and it was observed that there was no tendency of coagulation between particles, and that in the particle diameter had remained stable, the particle diameter remaining below 4μ with no sign of abnormality.

*Example 2*

A water solution of polyvinyl alcohol (3%), formaldehyde (2%) and sulfuric acid (50%) was treated at 50° C. for 90 min. with stirring, and then the temperature was lowered to 40° C. A 5% water solution of a surface-active agent (dodecylpyridiniumchloride) was gradually added in an amount equal to the volume of original reaction fluid, while agitating at the rate of 2000 r.p.m. When the entire amount of surface-active agent had been added, polyvinyl formal in finely-divided form was produced. Cyclohexylaminoacetaldehydedimethylacetal was then added in the amount of 70 mol percent of the polyvinyl alcohol, the reaction temperature was lowered to 60° C., and the aqueous mixture was allowed to react for 8 hours. Formalin was then added to the mixture until the amount of total formaldehyde reached 5%, and reaction was continued at 50° C. for 60 min.

The thus reacted aqueous product was filtered through a 0.5μ-filter paper so as to separate unreacted formaldehyde, cyclohexylaminoacetaldehydedimethylacetal and sulfuric acid. The finely-divided polyvinylacetal containing basic nitrogen was thoroughly washed and without drying was dispersed in water to form a 5% aqueous emulsion.

The amount of basic nitrogen in the fine particles was 2.0%. This emulsion was mixed with 10% polyvinyl alcohol, and was left to continue reaction at 150° C. under a pressure of 10 kg./cm.² gage for 5 hours. At the end of this time, the condition of the dispersion of fine particles and the particle diameter of the solid phase of reacted emulsion were determined by the use of an optical microscope and these characteristics were compared with those of the emulsion soon after it was mixed and dispersed in water. There was seen nothing abnormal in both samples with respect to the condition of the dispersion and the particle diameter, showing that even under such high temperature and pressure, the emulsion is extremely stable.

*Example 3*

A water solution containing polyvinyl alcohol (4%), benzaldehyde (5%), sulfuric acid (50%), β-cyclohexylaminobutylaldehydedimethylacetal (100 mol percent based on polyvinyl alcohol) and 1% of a surface-active agent such as used in Example 1 or 2 reacted at 50° C. for 2 hours. After treatment, a 0.5% water solution of the surface-active agent was gradually added in an amount equal to the volume of the original reaction fluid while agitating at the rate of above 2000 r.p.m. When addition was completed, polyvinyl benzal containing basic nitrogen in finely-divided form was produced. This emulsion was filtered through 1μ-filterpaper to remove unreacted aldehyde and sulfuric acid. Then the fine particles were washed, and directly dispersed in water so as to form a 10% emulsion. The diameter of the particles forming the emulsion was 2–3μ, and the basic nitrogen content was 1.5%.

After this emulsion had been allowed to stand for 30 days at room temperature, there was observed no sign of sedimentation. Furthermore, it was found to maintain an entirely stable condition of dispersion even when it was exposed to the high temperatures and pressure specified in Examples 1 and 2.

*Example 4*

Following the procedure described in Example 1, a 10% water suspension of fine particles of polyvinyl formal was prepared. To this suspension was added 1-dimethylamino-2,3-epoxypropane in the amount of 200 mol percent based on the fine particles of polyvinyl formal, and the mixture was reacted at 90° C. for 7 hours with stirring. The fine particles in the reacted solution were filtered, then washed for several times, and dispersed in water, whereby a 10% emulsion of polyvinyl formal containing basic nitrogen was obtained.

The stability of this emulsion was found to be as good as those mentioned in Examples 1 and 2, and even when it was allowed to stand at 80° C. for 24 hours with the addition of up to 5% of caustic soda, nothing abnormal was observed with respect to the stability of the emulsion or the particle diameter.

*Example 5*

Vinyl acetate (450 g.) and 5-ethyl-2-vinylpyridine (36.7 g.) were mixed, to the mixture was added benzoyl peroxide (4.9 g.) as catalyzer, and bulk polymerization was begun at 60° C. At the end of 48 hours, the copolymer was dissolved in methanol, reprecipitated in water, and boiled in water, whereby 370 g. of copolymer was obtained.

This copolymer was dissolved in methanol (3 l.), then saponified by means of about 2 N caustic soda, and 160 g. of saponification product was obtained. The nitrogen content of this saponification product was 0.8%. A water solution of 3% of this copolymer of vinyl alcohol containing basic nitrogen, formaldehyde (1%) and sulfuric acid (50%) was then reacted at 50° C. for 2 hours while agitating at the rate of 1000 r.p.m. The temperature was then lowered to 40° C., and a water solution of a dispersing agent (1%) was gradually added until the solution had been diluted to twice its original volume. This solution was dialyzed in running water to remove unreacted components and sulfuric acid, and to purify it. Thus, an emulsion having very good stability was obtained, which was comparable with that which is described in Example 1.

*Example 6*

A copolymer (80 g.) of vinyl acetate with 11.8 mol percent methylvinylketone was dissolved in methanol (0.5 l.) saturated with ammonia, to which was added Raney nickel (1 g.). This mixture was placed in a 1-liter autoclave, hydrogen was introduced up to 42 atmospheres gage pressure, and reaction was continued at 80° C. for 4 hours. The product was precipitated in methanol and washed. By use of the copolymer containing basic nitrogen thus obtained, formalization was effected in the manner described in Example 5, whereby there was obtained an emulsion which was extremely stable against the addition of sodium sulfate and at a temperature of 120° C.

*Example 7*

A mixture consisting of vinyl acetate (73 g.) allylbromide (8.2 g.), polyvinyl alcohol (12.1 g.), potassium persulfate (16 g.), acid sodium sulfite (1 g.) and water (600 g.) was subjected to emulsification polymerization at 60° C., with stirring.

After two hours, the emulsion was coagulated and the emulsified particles precipitated. After a further period of 5 hours, the precipitated material was dissolved in methanol, and this solution poured into water. The mixture was boiled and purification was then repeated, whereby a copolymer containing allylbromide (145 mol percent) was obtained with a yield of 55%. This copolymer was dissolved in methanol, to which diethylamine (500 mol percent based on the allylbromide) was added. Then the solution was introduced into an autoclave and was reacted at 70° C. for 24 hours, to convert the greater part of the bromine group into the diethylamino group. Next, in the manner described in Example 5, formalization was effected upon the copolymer containing basic nitrogen obtained by conventional saponification by means of caustic soda of the above-described copolymer and, after purification, there was obtained a stable emulsion having the same characteristics as the emulsion described in Example 4.

*Example 8*

A water solution containing chloracetaldehyde (0.5%), formaldehyde (1%), polyvinyl alcohol (3%) and sulfuric acid (50%) was reacted as described in Example 3. Then the solution was diluted to obtain, in finely-divided form, acetalized polyvinyl alcohol containing halogen. This was treated in water containing ethylenediamine (30%) at 80° C. for 10 hours with stirring. After unreacted ethylenediamine was removed and purification was effected as described in Example 1, there was obtained an extremely stable emulsion comparable to the emulsion described in Example 1.

It will be understood that, in accordance with the present invention, polyvinyl alcohol compounds containing basic nitrogen are acetalized with aldehydes containing no basic nitrogen or polyvinyl alcohol having basic nitrogen introduced by one of the several procedures described above is used and the polyvinyl alcohol is reacted with an aldehyde containing no basic nitrogen before, after, or simultaneously with the introduction of the basic nitrogen.

The various reactions referred to for the purpose of introducing basic nitrogen into the polyvinyl alcohol molecule are carried out by techniques well known in the polyvinyl alcohol art. Reference is also made to Osugi et al. Patent No. 2,906,594 with respect to polymers containing basic nitrogen and with respect to the introduction of basic nitrogen.

The surface-active or dispersing agents which are suitably employed are, in addition to those mentioned above, any of the many dispersing agents known to those skilled in the art of making emulsions or dispersions of polymers.

It will therefore be understod that, unless otherwise indicated, conventional operations and conventional apparatus are employed in carrying out the process of this invention including conventional mixing and emulsifying units. The conditions and the relative relationships set forth in the examples are those preferred in carrying out the process of the invention but it will be understood that other conditions and relationships may be used within the scope of the invention.

The stable polymer dispersions produced in accordance with the present invention are particularly suitable for the spinning of fibers in accordance with known processes used in the spinning of polyvinyl alcohol and polyvinyl alcohol derivatives, particularly the so-called "wet-spinning" techniques as described, for example, in Cline et al. U.S. Patent 2,610,360 and the above-mentioned Osugi et al. patent. An especially preferred spinning technique is described in copending application Serial No. 336,166 of Tomonari et al. filed February 10, 1953, now U.S. Patent 2,988,802.

After formation of the fibers by wet spinning the filaments can be further treated by stretching, heat treating, acetalization, and the like to produce fibers with desirable and outstanding properties, using known techniques as described in said patents.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:
1. A method of forming stable emulsions which comprises providing in an aqueous medium dispersed, finely-divided, water-insoluble acetalized polymer particles having a size range from 0.01μ to 10μ diameter, said polymer particles being selected from the group consisting of acetalized polyvinyl alcohol containing basic nitrogen chemically bonded thereto and acetalized copolymers composed principally of vinyl alcohol and containing basic nitrogen chemically bonded thereto, prepared by acetalizing in an aqueous medium a polymer selected from the group consisting of polyvinyl alcohol and a copolymer composed principally of vinyl alcohol by means of an aldehyde containing no basic nitrogen, and introducing into said polymer basic nitrogen in the amount of about 0.2 to 5 percent by reacting said polymer with a reactant capable of introducing basic nitrogen into said polymer.

2. A method as defined in claim 1 wherein basic nitrogen is introduced into said compound prior to acetalization.

3. A method as defined in claim 1, wherein basic nitrogen is introduced into said compound after acetalization.

4. A method as defined in claim 1, wherein basic nitrogen is introduced into said compound simultaneously with acetalization.

5. A stable emulsion produced by the process of claim 1.

6. A method of forming stable emulsions which comprises providing in an aqueous medium dispersed, finely-divided, water-insoluble acetalized polymer particles having a size range from 0.01$\mu$ to 10$\mu$ diameter, said polymer particles being selected from the group consisting of acetalized polyvinyl alcohol containing basic nitrogen chemically bonded thereto and acetalized copolymers composed principally of vinyl alcohol and containing basic nitrogen chemically bonded thereto prepared by acetalizing in an aqueous medium to a degree of acetalization of 20 to 80 percent a polymer selected from the group consisting of polyvinyl alcohol and a copolymer composed principally of vinyl alcohol by means of an aldehyde containing no basic nitrogen, and introducing into said polymer basic nitrogen in the amount of about 0.2 to about 5 percent by reacting said polymer with a reactant capable of introducing basic nitrogen into said polymer.

7. A method of forming stable emulsions which comprises providing in an aqueous medium dispersed, finely-divided, water-insoluble acetalized copolymer particles having a size range from about 0.01$\mu$ to 10$\mu$ diameter said copolymer particles being selected from the group consisting of acetalized copolymers composed principally of vinyl alcohol and containing basic nitrogen chemically bonded thereto and prepared by acetalizing to a degree of acetalization of 20 to 80 percent in an aqueous medium a copolymer composed principally of vinyl alcohol by means of an aldehyde containing no basic nitrogen, and introducing into said copolymer basic nitrogen in the amount of about 0.2 to 5 percent by reacting said copolymer with a reactant capable of introducing basic nitrogen into said copolymer.

8. A method of forming stable emulsions which comprises providing in an aqueous medium dispersed, finely-divided, water-insoluble acetalized polymer particles having a size range from 0.01$\mu$ to 10$\mu$ diameter, said polymer particles being selected from the group consisting of acetalized polyvinyl alcohol containing basic nitrogen chemically bonded thereto and acetalized copolymers composed principally of vinyl alcohol and containing basic nitrogen chemically bonded thereto and prepared by acetalizing in an aqueous medium to a degree of acetalization of 20 to 80 percent, a polymer selected from the groups consisting of polyvinyl alcohol and a copolymer composed principally of vinyl alcohol by means of an aldehyde containing no basic nitrogen, and introducing into said compound, simultaneous with said acetalizing, basic nitrogen in the amount of about 0.2 to 5 percent by reacting said polymer with a reactant capable of introducing basic nitrogen into said polymer.

9. A method of forming stable emulsions which comprises providing in an aqueous medium, finely-divided, water-insoluble, acetalized polymer particles having a size range from 0.01$\mu$ to 10$\mu$ diameter, said polymer particles being selected from the group consisting of polyvinyl alcohol containing about 0.2 to 5 percent basic nitrogen chemically bonded thereto and copolymers composed principally of vinyl alcohol containing about 0.2 to 5 percent basic nitrogen chemically bonded thereto, said selected nitrogen-containing polymer being acetalized in an aqueous medium to a degree of acetalization of 20 to 80% by means of an aldehyde containing no basic nitrogen after introduction of said nitrogen content.

References Cited by the Examiner

UNITED STATES PATENTS

| | | | |
|---|---|---|---|
| 2,250,681 | 7/1941 | Schwartz | 260—91.3 |
| 2,345,946 | 4/1944 | Overbaugh | 260—29.6 |
| 2,420,730 | 5/1947 | Woodward | 260—91.3 |
| 2,455,402 | 12/1948 | Bromley | 260—29.6 |
| 2,464,717 | 3/1949 | Porter | 260—91.3 |
| 2,906,594 | 9/1959 | Osugi et al. | 260—91.3 |
| 2,960,384 | 11/1960 | Osugi et al. | 260—73 |
| 3,142,532 | 7/1964 | Fukushima et al. | 260—73 |

FOREIGN PATENTS 733,102   7/1955   Great Britain.

MURRAY TILLMAN, *Primary Examiner.*

DANIEL ARNOLD, WILLIAM H. SHORT, *Examiners.*